United States Patent Office 3,159,433
Patented Dec. 1, 1964

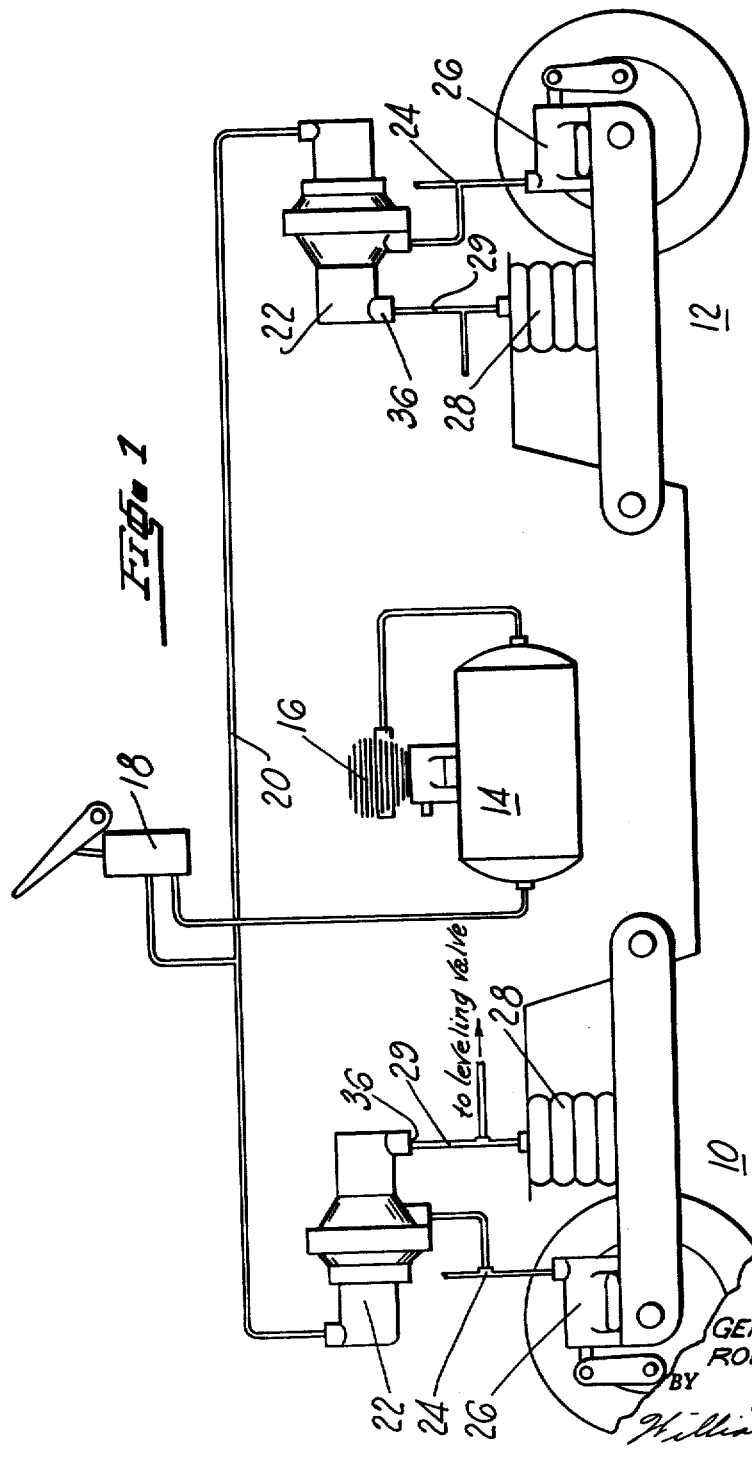

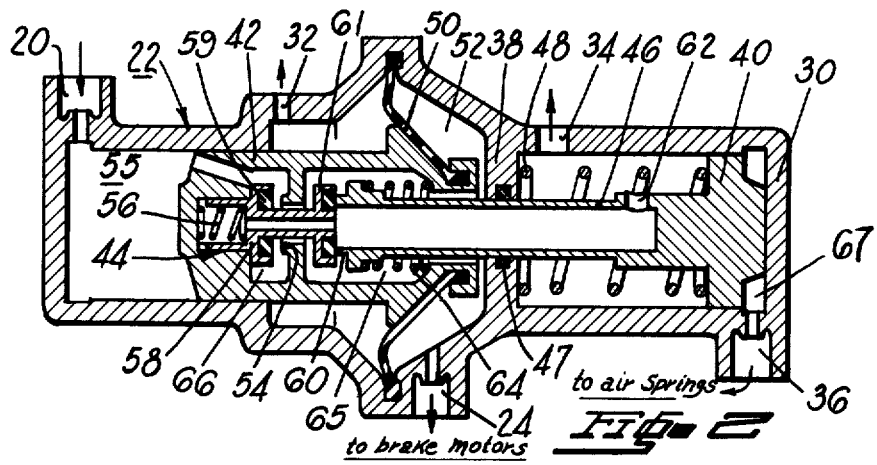
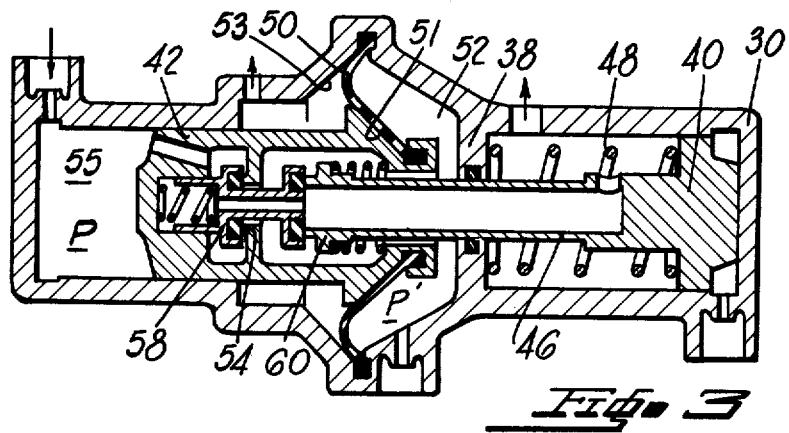
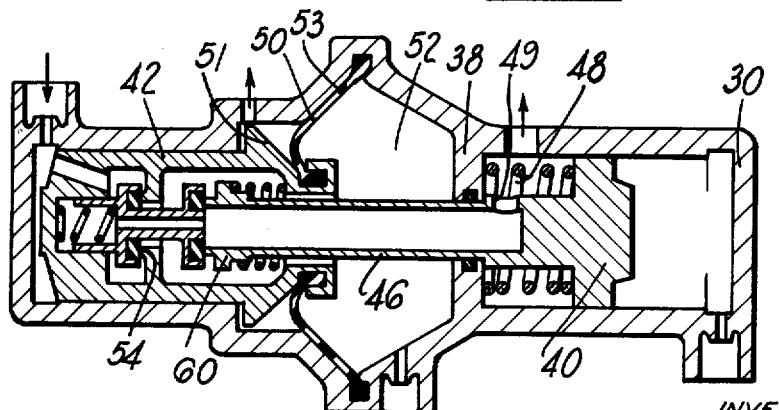

3,159,433
BRAKE PROPORTIONING VALVES
Gerard Chevreux, Colombes, and Roland Muterel, Saint Denis, France, assignors to The Bendix Corporation, Detroit, Mich., a corporation of Delaware
Filed July 24, 1961, Ser. No. 127,450
Claims priority, application France Dec. 30, 1960
3 Claims. (Cl. 303—22)

This invention relates to brake systems for vehicles and more particularly to proportioning valves for varying the braking forces exerted on the axles of a vehicle in accordance with the load on the axles.

An object of the invention is to provide in a fluid pressure brake system for a vehicle an improved proportioning valve for varying the braking force exerted by the brakes on the wheels of an axle in accordance with the load on the axle.

More particularly, it is an object of the invention to provide in a fluid pressure brake system for a vehicle a proportioning valve for varying the relative braking forces exerted on the front and rear wheels of the vehicle depending upon the load repartition between the front and rear axles of the vehicle.

Another object of the invention is to provide a load responsive proportioning valve which utilizes the pressure in an air spring of the vehicle air pressure suspension system for determining the applied braking force.

Other objects and advantages of the invention will become apparent from the following description which refers to the accompanying drawings, wherein:

FIGURE 1 is a schematic view of a first embodiment of an air pressure brake system embodying features of the present invention, with the air suspension system schematically illustrated;

FIGURE 2 is a vertical cross-sectional view of a preferred embodiment of one of the brake proportioning valves used in the system of FIGURE 1, showing the parts in the positions assumed at rest;

FIGURE 3, similar to FIGURE 2, shows the parts in the positions corresponding to brake application with the corresponding axle supporting its minimum load (vehicle unloaded);

FIGURE 4, similar to FIGRE 2, shows the parts in the positions corresponding to brake application with the corresponding axle supporting its maximum load (vehicle fully loaded).

Referring to FIGURE 1, there is shown an air pressure braking system of well-known type but for the adjunction of brake proportioning valves. The system comprises a circuit for the front axle 10, a circuit for the rear axle 12, and common elements. The common elements consist in a reservoir 14, a compressor 16 for maintaining the pressure in reservoir 14 above a predetermined value, a control valve 18 and the necessary connecting lines. The control valve 18 is actuatable by the vehicle driver for controlling communication between the reservoir 14 and a service line 20.

Each circuit associated with an axle includes a brake proportioning valve 22 connected to the service line 20 and to a conduit 24 leading to conventional brake motors 26, one of which is shown for each axle (FIGURE 1); the pressure which prevails in the axle fluid pressure suspension means, schematically shown as an air spring 28, is communicated to the proportioning valve by a line 29. The air springs 28 may preferably be supplied with air pressure by a conventional leveling valve (not shown) responsive to axle loading for maintaining the frame of the vehicle at a predetermined height above the axle. Since the leveling valve is not part to the present invention and may be of any well-known type, it is believed unnecessary to give a description thereof.

Referring now to FIGURE 2, each proportioning valve comprises a housing 30 provided with an inlet port connected to service line 20, an outlet port connected to brake conduit 24, vents 32 and 34 to atmosphere, and a port 36 communicating with air spring 28.

The internal chamber of the housing is separated by a partition 38 in two chambers sealingly slidably receiving a piston 40 and a plunger 42, respectively; a valve assembly 44 is located within the plunger 42. The housing 30 and plunger 42 should obviously comprise a plurality of assembled parts, but for clarity they will be regarded as integral in the following description.

The piston 40 is subjected to the differential between the suspension pressure prevailing in chamber 67 and the atmospheric pressure communicated to the other side of the piston through vent 34. Piston 40 is provided with a tubular projection 46 whose axial bore is connected to atmosphere at all times by a transversal drilling 62 and the vent 34 in the wall of the housing. The projection is slidable in an opening in the partition member and a suitable O-ring seal 47 is provided in the opening wall to seal off the chamber 52. Piston 40 is biased toward its extreme right-hand position by a spring 48 whose preload is sufficient to maintain the piston against the end wall of the housing when the load on the corresponding axle is minimum (FIGURES 2 and 3). When the vehicle is fully loaded, the suspension pressure compresses the spring and brings a shoulder 49 of the tubular projection into abutment against partition 38 (FIG. 4).

According to principles of the present invention the plunger is provided with means which provides a large reaction force thereon when suspension pressure is low, and gradually decreases the reaction force as the suspension pressure increases. Such means comprises an annular diaphragm 50 having its internal periphery fixed to plunger 42 and its external periphery secured to the housing, and subjected to the pressure differential between atmosphere and the braking pressure prevailing in the control chamber 52 limited by the diaphragm and the partition member 38. Chamber 52 communicates with the brake motors through brake conduit 24. When the plunger 42 is in its extreme right-hand position (FIGS. 2 and 3) the greater part of diaphragm 50 is in abutting connection with a radially outwardly facing substantially frusto-conical surface 51 formed on the plunger for that purpose. When the plunger 42 is in its extreme left-hand position (FIG. 4) the greater part of diaphragm 50 is in abutting connection with an inwardly facing substantially frusto-conical surface 53 of housing 30.

An inlet valve seat 54 is formed on plunger 42 and communicates control chamber 52 with an inlet chamber 65 into which the inlet port opens. A spool-shaped poppet member 58 has a pressure poppet 59 which is biased by a closure spring 56 toward a position where it closes valve seat 54. On the end portion of tubular projection 46 there is provided an atmospheric seat 60 connected to atmosphere through the internal bore of projection 46, transverse drilling 62 and vent 34. An atmospheric poppet 61 of spool-shaped member 58 is adapted to close seat 60.

The seat 54 communicates two chambers 65 and 66 formed in the plunger and in permanent communication with chamber 52 and service line 20, respectively. In rest condition a return spring 64 loaded between a terminal flange of projection 46 and a shoulder on plunger 42 overcomes the force of closure spring 56 and moves the plunger to the right until poppet member 58 abuts a stop shoulder formed in the plunger; pressure poppet 59 then clears inlet valve seat 54 while atmospheric poppet 61 closes atmospheric seat 60 (FIG. 2). The brake conduit is then connected to the service line and separated from atmosphere.

When the pressure in air spring 28 increases due to an increase in the load on the corresponding axle, the pressure force on piston 40 compresses spring 48 and moves piston 40 and projection 46 to the left from the rest position of FIGURES 2–3. When the load on the axle attains or exceeds a predetermined value, the force of the corresponding suspension pressure acting on the piston moves it to the position of FIG. 4. When the vehicle is unloaded (FIGS. 2 and 3) the greater part of diaphragm 50 bears against surface 51 of plunger 42; on the contrary when the vehicle is fully loaded the greater part of the diaphragm bears against surface 53 of housing 30 (FIG. 4). The diaphragm accordingly transmits a portion of the total pressure force that it receives to housing 30 and a portion to plunger 42. The frusto-conical surfaces 51 and 53 have a shape which may preferably be determined so that the effective area of the diaphragm (i.e. the area adapted to transmit the pressure force that it receives to the plunger) is a percentage of the total diaphragm area which varies in inverse proportion of the percentage of the maximum service pressure in the air springs communicated to port 36.

Operation of the proportioning valve mechanism is as follows: with the brakes in release condition and the piston 42 in any position, the constituents of the valve assembly 44 are in the positions shown in FIG. 2. If the driver actuates the control valve 18 to deliver a pressure $p$ to service line 20 and to the inlet chambers 55 of the proportioning valves 22, valve 22 will regulate the pressure in the brake conduits 24 at a value $p'$ which depends on the pressure in the corresponding air springs: As soon as compressed air is delivered to chamber 52 through valve assembly 44, a pressure force is exerted on diaphragm 50 toward the left on FIGURES 2–4. A part of the pressure force is transmitted to plunger 42 and moves it to the left against the force of closure spring 64 thereby allowing poppet 59 to close seat 54 (FIGS. 3 and 4). As soon as pressure poppet 59 is seated, a differential pressure may develop between inlet chamber 55 and control chamber 52. The inlet pressure $p$ in the service line 20 acts upon the left-hand surface of the plunger while the pressure $p'$ in chamber 52 communicated to the brake motors 26 acts upon the right-hand surface of the diaphragm and against the plunger portion at the right of the internal partition in the latter. The plunger moves to a position where the valve is in "lapped" condition, i.e. both valve seats 54 and 60 are closed with the inlet pressure force on the plunger 42 balancing the pressure force on the "effective" surface of diaphragm 50. In balanced condition, the pressures $p$ and $p'$ are in inverse proportion to the areas of the surfaces subjected to the pressures and transmitting a force to the plunger; for an appropriate shape of the abutting surfaces 51 and 53, the ratio $p'/p$ will be variable in direct proportion to the ratio of the actual and maximum predetermined loads on the axle for any load condition from unload (FIGURES 2 and 3) to full load (FIGURE 4).

When the driver permits the pedal of control valve 18 to retract in order to decrease the braking pressure, the pressure in service line 10 decreases and unbalance between the pressure forces on plunger 42 occurs; the plunger moves slightly toward the left with respect to projection 46 from the "lapped" condition illustrated in FIGURES 3 and 4. Poppet 61 clears the atmospheric seat and the pressure $p'$ in chamber 52 decreases until the plunger moves back to again "lap" the valve. If the driver completely releases the pedal, atmospheric pressure is admitted to inlet chamber 55 and the plunger comes back to the position of FIGURE 2 after the pressure in chamber 55 has decreased to atmospheric pressure too.

In a modified embodiment of the invention, the vent 32 to atmosphere may be replaced with a connection to an emergency control device which normally communicates the left-hand side of diaphragm 50 to atmosphere, but is adapted to impress fluid pressure to the diaphragm either automatically responsive to occurrence of emergency conditions, or upon manual actuation. The provision of such an emergency device will provide emergency braking in the event of failure or leakage of diaphragm 50. Emergency devices adapted to communicate an inlet either to atmosphere or to a pressure source are well known in the art and need not be described.

The embodiment illustrated in FIGURES 2–4 has been given by way of example only, and numerous modifications are within the reach of the man of the art: for instance the left-hand end wall of plunger 42 may be formed as a flexible diaphragm carrying the spool type poppet 58; the "effective" area subjected to the inlet pressure may be variable, in contradistinction with the embodiment shown where it is the outlet pressure in control chamber 52 which prevails against a variable "effective" area of the diaphragm-plunger assembly; while the system as described is adapted to control an air braking pressure responsive to the pressure in air suspension springs, embodiments may be designed which control a hydraulic braking pressure and/or are responsive to mechanical deflection of a suspension spring. It is intended that the above modifications and generally all revisions and adaptations to suit individual design requirements will be included within the scope of the following claims as equivalents of the invention.

We claim:

1. In combination with a vehicle having a fluid pressure suspension means, a braking system including a brake control valve, a brake motor and a brake proportioning valve between said brake control valve and said brake motor, said brake proportioning valve comprising:
   a housing having an inlet port connected to said control valve, an outlet port connected to said brake motor and a control port connected to said fluid pressure suspension means;
   a first pressure responsive means movable in the housing, which first pressure responsive means has an area responsive to inlet port pressure and another area responsive to outlet port pressure with the effective area responsive to inlet port pressure being substantially constant and the effective area responsive to outlet port pressure being variable;
   a valve means operatively mounted within said first pressure responsive means for connecting and disconnecting said inlet and outlet ports, said valve means including a second pressure responsive means for positioning said first pressure responsive means to vary the effective area subjected to outlet port pressure, which second pressure responsive means is responsive to a pressure developed by said fluid pressure suspension means; and
   a resilient means including a first spring interposed between said first pressure responsive means and said second pressure responsive means for operatively connecting said pressure responsive means, and a second spring interposed between said second pressure responsive means and said housing to reference producing a force equivalent to the minimum pressure exerted by said fluid pressure suspension means when the vehicle is empty of any load.

2. In a vehicle braking system including a brake control valve and brake motors, a brake proportioning valve comprising:
   a housing having an inlet port connected to said control valve, an outlet port connected to said brake motors and a control port connected to a variable control pressure source;
   a first pressure responsive means movable in the housing having a first area responsive to inlet pressure and a second area responsive to outlet pressure which second area is variable in accordance with the position of said first pressure responsive means;
   a valve means carried by said first pressure responsive means for connecting and disconnecting said inlet and outlet ports, said valve means including a second pressure responsive means for positioning said first pressure responsive means to increase or decrease said second area to increase or decrease the pressure needed on said first area to open said valve means and connect said inlet port with said outlet port; and a spring means including a first spring interposed between said first pressure responsive means and said second pressure responsive means to operatively connect said pressure responsive means and a second spring operatively connecting said second pressure responsive means to said housing to oppose movement of said second pressure responsive means to maintain the ratio of output port pressure to inlet port pressure equivalent to the ratio of spring forces to control port pressure.

3. In a valve structure:

a housing having a first chamber and a second chamber;

a plunger adapted to form a first variable volume chamber in said first chamber and to project into said second chamber, said plunger having a passage therethrough;

a means to deliver a fluid to said first variable volume chamber;

a diaphragm having its radially inner periphery attached to the end of said plunger in said second chamber and its radially outer periphery sealingly attached to the housing surrounding said second chamber to divide said second chamber into a second and third variable volume chambers with said second and variable volume chamber being subjected to atmospheric pressure;

a valve means slidably mounted in said plunger to open or close said passage in said plunger; to control communication of fluid between said first variable volume chamber and said third variable volume chamber via said passage means in said plunger;

a pressure responsive means slidably mounted in said housing, which pressure responsive means has a projection extending through the passage in said plunger to abut with said valve means;

a first resilient means between said plunger and said valve means to urge said valve means to abut with said projection of said pressure responsive means;

a second resilient means between said plunger and said projection to urge said plunger to open said valve means; and a third resilient means between said housing and said pressure responsive means to oppose movement of said pressure responsive means which causes movement of said plunger and varies the effective area of said diaphragm operative to oppose plunger movement to control said valve means.

References Cited in the file of this patent

UNITED STATES PATENTS

| | | |
|---|---|---|
| 2,657,774 | Perrot | Aug. 6, 1947 |
| 2,950,147 | Neubeck | Aug. 23, 1960 |
| 2,985,490 | Gates | May 23, 1961 |
| 2,986,427 | McClure et al. | May 30, 1961 |
| 3,011,833 | Stelzer | Dec. 5, 1961 |
| 3,018,139 | Stelzer | Jan. 23, 1962 |

UNITED STATES PATENT OFFICE
CERTIFICATE OF CORRECTION

Patent No. 3,159,433 December 1, 1964

Gerard Chevreux et al.

It is hereby certified that error appears in the above numbered patent requiring correction and that the said Letters Patent should read as corrected below.

Column 4, line 59, after "to" insert -- produce a --; line 60, strike out "producing a"; column 6, line 1, for "and" read -- ond --.

Signed and sealed this 22nd day of June 1965.

(SEAL)
Attest:

ERNEST W. SWIDER
Attesting Officer

EDWARD J. BRENNER
Commissioner of Patents